F. SEIFFERT.
EXPANSION JOINT DEVICE.
APPLICATION FILED JUNE 22, 1907.
924,279.
Patented June 8, 1909.
2 SHEETS—SHEET 2.
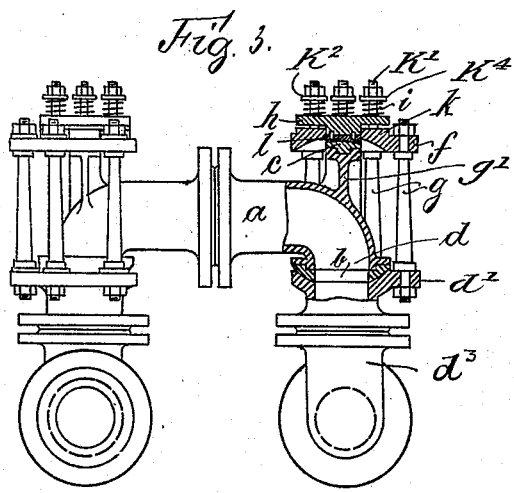
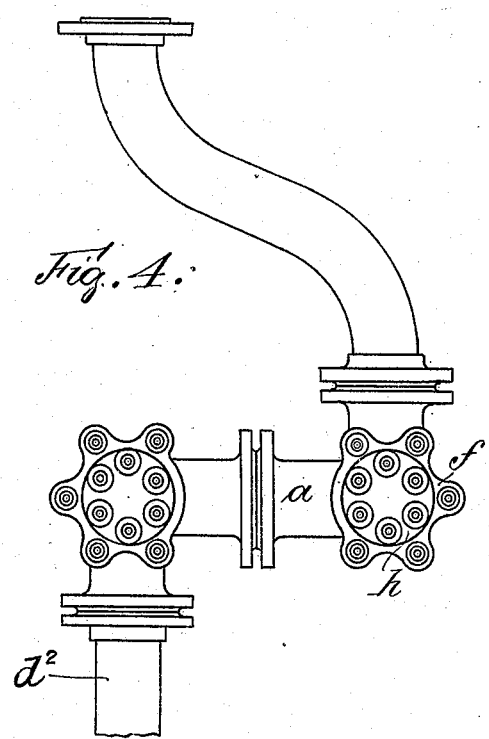

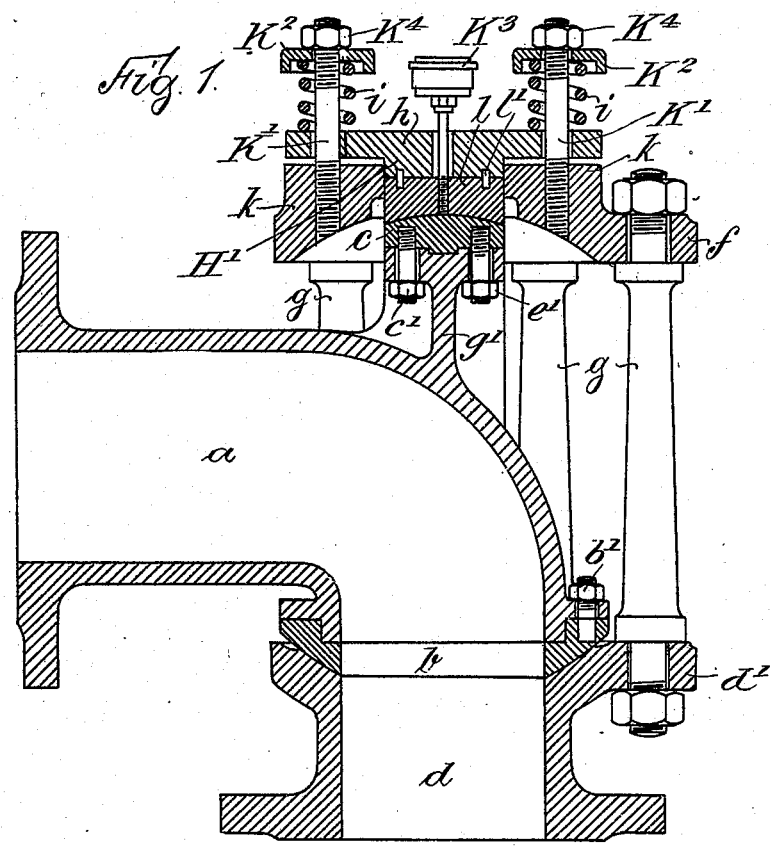
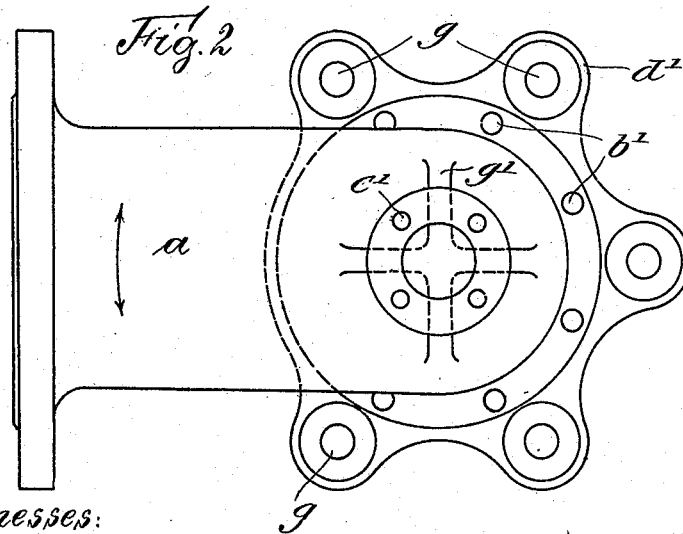

UNITED STATES PATENT OFFICE.

FRANZ SEIFFERT, OF BERLIN, GERMANY.

EXPANSION-JOINT DEVICE.

No. 924,279.     Specification of Letters Patent.     Patented June 8, 1909.

Application filed June 22, 1907. Serial No. 380,315.

*To all whom it may concern:*

Be it known that I, FRANZ SEIFFERT, a subject of the King of Prussia, and resident of 154ª Köpenickerstrasse, Berlin, German Empire, have invented a new and Improved Expansion-Joint Device, of which the following is an exact specification.

The present invention relates to improvements in expansion joints of the type in which two lengths of piping, in which the expansion is to be counter-balanced, are connected by means of a cross piece with ball joints. Hitherto in such devices the ball joints have been arranged entirely in the interior and have been subjected to the direct heating action of the fluid passing through the conduits or pipe lengths.

The present invention has for its object to provide an expansion joint of this type which operates more smoothly and in which the minimum surface of the working parts is subjected to the direct heating action of the fluid passing through the conduit. To this end the improved expansion joint is provided with ball joint connections for the cross piece having part of the ball arranged as a fluid pipe-jointing surface and an other part arranged as a counter pressure bearing externally to the fluid conduit. The convex spherical surfaces are rigidly connected—as will be seen from the drawings and the following description while the concave parts are resiliently connected.

The invention will be more readily understood from the accompanying drawings, in which—

Figure 1 is a cross section through one of the ball joints according to the present invention, Fig. 2 is a plan of the arrangement shown in Fig. 1 the parts above the spherical bearing surface being removed in the upper half of Fig. 2, Fig. 3 is an elevation of the expansion joint complete, Fig. 4 is a plan of the same.

In carrying the invention into effect according to the form shown the cross piece is composed of two elbow pieces $a$ joined together as illustrated in Fig. 3. These elbow pieces $a$ are connected to the pipe length $d^2$ through elbow pieces $d^3$ and short connection pieces $d$. Between the connection piece $d$ and the elbow piece $a$ a spherical joint is employed as illustrated separately in Figs. 1 and 2.

In Fig. 1 to the end of the elbow piece $a$ there is fixed by means of studs $b'$ a spherical convex plate $b$ adapted to fit in a corresponding concave spherical surface on the joining end of the pipe piece $d$. The sphere of which the surface of the piece $d$ is a part is struck from a center located at the intersection of the axes of the elbow piece $a$. The pipe piece $d$ is provided with lugs $d'$ to which are fastened standards or hangers $g$. These hangers or standards $g$ act as distance pieces and support a head $k$ provided with a flange $f$ having lugs in which the upper ends of the distance pieces $g$ engage.

External to the elbow piece $a$ and at the angles thereof there is arranged a web $g'$ which as shown is preferably cast in one with the elbow piece. The web $g'$ is arranged axially of the spherical flange plate $b$ forms a support for the counter pressure bearing $c$ which is secured to the support by means of bolts $c'$. The plate $c$ is provided with a convex spherical surface which is part of the same sphere as the plate $b$ on the end of the elbow piece $a$.

On the counter pressure bearing $c$ there rests a plate $l$ provided with a concave spherical bearing surface corresponding to the convex surface of the plate $c$. This plate $l$ is held in position by means of a plate $h$ to which the plate $l$ is connected by means of dowel pins or the like $l'$. The plate $l$ and the part $h'$ of the plate $h$ slide within the head piece $k$ and the flange of the plate $h$ is provided with holes through which there pass studs $k'$. On the ends of the studs $k'$ there are provided nuts $k^4$ and washers $k^2$ which form an end abutment for springs $i$. For the purpose of lubricating the surface of the counter pressure bearing $c$ a lubricator $K^3$ is provided.

It will be seen that by the construction described and illustrated the concave plate $l$ is resiliently held against the counter bearing $c$ and at the same time the pipe piece $d$ is resiliently held to the convex spherical surface of the plate $b$.

The operation of expansion joints of this type is well understood and may be clearly seen from Fig. 4. Thus if the pipe length $d^2$ expand the ball joints at the ends of the elbow pieces $a$ rotate about the axis A—B in Fig. 3 and in the direction shown by the arrow in Fig. 2. By arranging the ball joint partly in the form of a jointing surface and partly in the form of a counter pressure bearing as herein described, the minimum amount of bearing surface is subjected to the heating action of the fluid and consequently the lubrication of the joint is greatly facilitated and the durability increased.

The pipe lengths $d^2$ to be connected may be arranged as shown in Fig. 4 i. e. one of the pipe lengths may be sent so that the conduit again resumes the same line.

I claim:

1. A swivel joint having in combination, an elbow piece, a convex spherical jointing flange on said elbow piece, an external web at the angle of said elbow piece and extending axially of said spherical flange, a convex spherical bearing on said web, said convex bearing forming a part of the same sphere as the spherical flange and resiliently connected concave parts bearing on said convex parts.

2. A swivel joint for use in expansion joints for hot fluid conduits, having in combination, an elbow piece, a convex jointing flange fixed to said elbow piece, a concave spherical jointing flange bearing on said convex jointing flange, an external web at the angle of said elbow piece and extending axially of said flanges, a convex spherical bearing plate on said web, said bearing plate being part of the same sphere as the convex jointing flange, standards carried by said concave jointing flange, a head piece supported on said standards and a concave counter bearing piece co-acting with the convex bearing piece on the external web, said counter bearing piece being resiliently supported by said head and pressed against its co-acting surface.

3. A swivel joint for use in expansion joints for hot fluid conduits having in combination, an elbow piece, a convex spherical jointing plate fixed to said elbow piece, a concave jointing flange co-acting with said convex jointing flange on the elbow piece, a web arranged externally on said elbow piece and extending axially of said jointing flanges, a convex bearing plate fixed to said web, said convex bearing plate being part of the same sphere as the convex jointing flanges, standards carried by the concave jointing flange, a head piece having a central opening therein supported on said standards, a counter bearing piece having a concave spherical bearing surface adapted to co-act with the convex bearing plate on the external web, said counter bearing piece being slidably arranged in the opening in said head piece, means for lubricating said counter bearing and means for resiliently pressing said counter bearing against the co-acting convex bearing plate.

In witness whereof I have hereunto set my hand in the presence of two witnesses.

FRANZ SEIFFERT.

Witnesses:
 WOLDEMAR HAUPT,
 HENRY HASPER.